(12) United States Patent
De Jonge

(10) Patent No.: US 11,263,502 B1
(45) Date of Patent: Mar. 1, 2022

(54) METHOD FOR MULTIFUNCTIONAL GRAPHICAL USER INTERFACE FILE INDICIA MOVEMENT, AND SYSTEM, TERMINAL AND COMPUTER READABLE MEDIA FOR THE SAME

(71) Applicant: TILIA LABS INC., Ottawa (CA)

(72) Inventor: Sagen Alek De Jonge, Ontario (CA)

(73) Assignee: TILIA LABS INC., Ottawa (CA)

( * ) Notice: Subject to any disclaimer, the term of this patent is extended or adjusted under 35 U.S.C. 154(b) by 0 days.

(21) Appl. No.: 17/084,617

(22) Filed: Oct. 29, 2020

(51) Int. Cl.
| | |
|---|---|
| *G06K 15/02* | (2006.01) |
| *G06F 3/12* | (2006.01) |
| *G06F 16/16* | (2019.01) |
| *G06F 9/54* | (2006.01) |
| *G06F 16/17* | (2019.01) |
| *G06F 16/182* | (2019.01) |
| *G06F 13/364* | (2006.01) |

(52) U.S. Cl.
CPC ....... *G06K 15/1809* (2013.01); *G06F 3/1208* (2013.01); *G06F 3/1253* (2013.01); *G06F 9/542* (2013.01); *G06F 13/364* (2013.01); *G06F 16/168* (2019.01); *G06F 16/1734* (2019.01); *G06F 16/1827* (2019.01)

(58) Field of Classification Search
CPC ... G06K 15/1809; G06F 9/542; G06F 3/1253; G06F 13/364; G06F 16/168; G06F 16/1734; G06F 16/1827; G06F 3/1208
See application file for complete search history.

(56) References Cited

U.S. PATENT DOCUMENTS

| | | | |
|---|---|---|---|
| 6,976,224 B2 | 12/2005 | Nii | |
| 7,283,257 B2 | 10/2007 | Bright et al. | |
| 9,026,931 B2 | 5/2015 | Hackett et al. | |
| 9,104,300 B2 | 8/2015 | Brownholtz et al. | |
| 9,886,188 B2 | 2/2018 | Saito et al. | |
| 10,222,970 B2 | 3/2019 | Hartman | |
| 2005/0131923 A1* | 6/2005 | Noguchi | .......... H04L 63/08 |

(Continued)

OTHER PUBLICATIONS

Page Laubheimer, Drag-and-drop: How to design for ease of use, dated Feb. 23, 2020, Nielsen Norman Group https://www.nnqroup.com/articles/drag-drop/.

*Primary Examiner* — Juan M Guillermety
(74) *Attorney, Agent, or Firm* — The Harris Firm

(57) ABSTRACT

A method, at a terminal having at least one associated graphical user interface(s)(GUI)(s), comprising: receiving input data, at one or more I/O device(s) associated with and communicatively connected to the terminal, selecting one or more file object(s) displayed on the at least one associated graphical user interface(s); retrieving, from a database stored on a computer-readable medium, parameters associated with one or more criteria for performing a sequence of one or more commands; accessing properties of file(s) associated with the one or more file objects; comparing the properties of the file(s) with the parameters associated with one or more criteria to determine which criteria are met; retrieving, from a database stored on a computer-readable medium, sequences of one or more commands to be performed under specified conditions; and calculating and initiating the appropriate sequence of commands. A terminal, system, and computer readable medium are also disclosed.

20 Claims, 14 Drawing Sheets

(56) References Cited

U.S. PATENT DOCUMENTS

| | | |
|---|---|---|
| 2007/0185832 A1 | 8/2007 | Kriebel |
| 2009/0237728 A1* | 9/2009 | Yamamoto ......... H04N 1/00474 |
| | | 358/1.15 |
| 2010/0275144 A1 | 10/2010 | Dejoras et al. |
| 2013/0275901 A1 | 10/2013 | Saas et al. |
| 2016/0171191 A1* | 6/2016 | Shimoshimano ....... G06F 21/10 |
| | | 726/33 |

\* cited by examiner

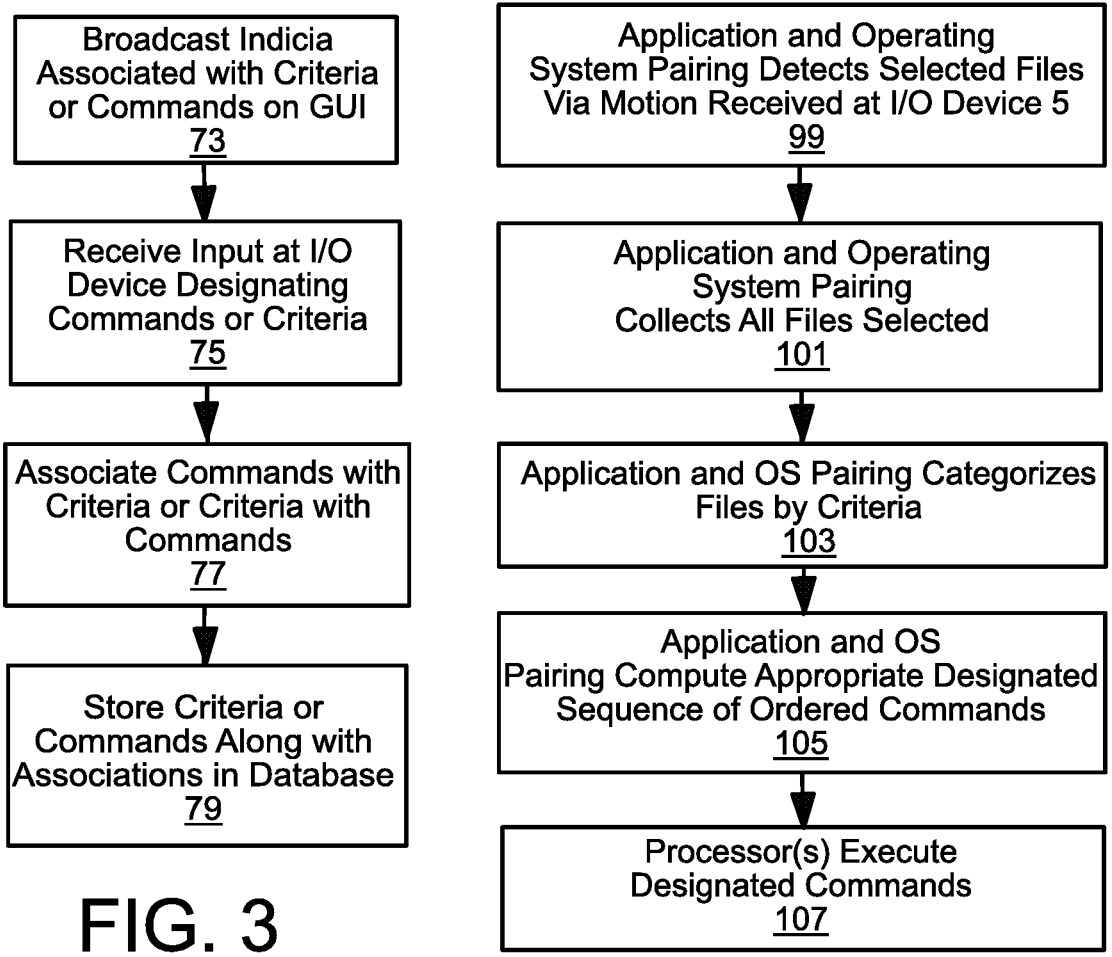
FIG. 3
FIG. 4
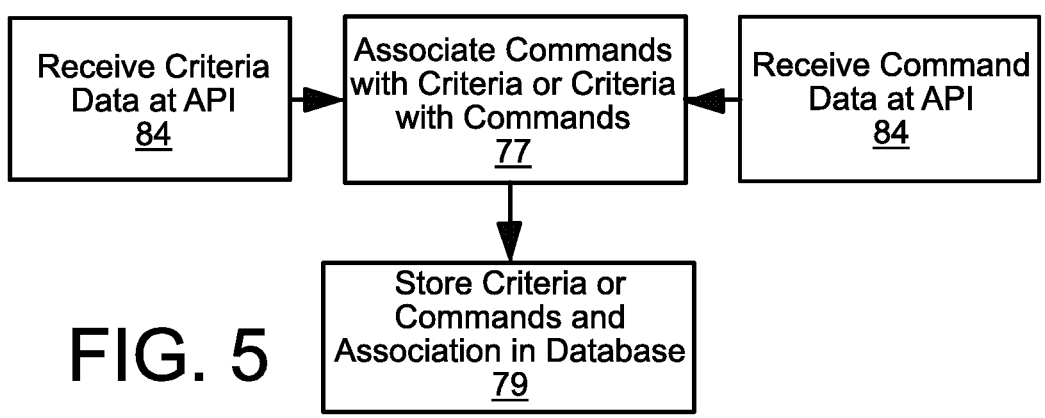
FIG. 5

| Name | Ordered | Grain | Width | Height | Bleed | Stock | Group | Front Inks | Back Inks | Min. Overruns | Max. Overruns |
|---|---|---|---|---|---|---|---|---|---|---|---|
| postcard1 | 10000 | | 5.47 in | 3.75 in | 0.0625 in | 14 pt. glossy | | | | 0 | 100 |
| postcard2 | 5000 | | 11.07 in | 8.49 in | 0.0625 in | 14 pt. glossy | | | | 0 | 100 |
| postcard3 | 3000 | | 5.14 in | 6.64 in | 0.0625 in | 14 pt. glossy | | | | 0 | 100 |
| postcard4 | 7000 | | 7 in | 5 in | 0.0625 in | 14 pt. glossy | | | | 0 | 100 |
| postcard5 | 1600 | | 2.5 in | 5.21 in | 0.0625 in | 14 pt. glossy | | | | 0 | 100 |
| postcard6 | 20000 | | 4.21 in | 5.47 in | 0.0625 in | 14 pt. glossy | | | | 0 | 100 |
| postcard7 | 15000 | | 6 in | 4 in | 0.0625 in | 14 pt. glossy | | | | 0 | 100 |
| postcard8 | 12000 | | 5.71 in | 4 in | 0.0625 in | 14 pt. glossy | | | | 0 | 100 |
| postcard9 | 2000 | | 5.71 in | 4 in | 0.0625 in | 14 pt. glossy | | | | 0 | 100 |
| postcard10 | 2000 | | 5.71 in | 4 in | 0.0625 in | 14 pt. glossy | | | | 0 | 100 |
| postcard11 | 3000 | | 4.21 in | 5.47 in | 0.0625 in | 14 pt. glossy | | | | 0 | 100 |
| postcard12 | 62000 | | 8.5 in | 11 in | 0.0625 in | 14 pt. glossy | | | | 0 | 100 |
| postcard13 | 2000 | | 4.2 in | 5.47 in | 0.0625 in | 14 pt. glossy | | | | 0 | 100 |

Data Table 1001 (containing Job Orders)

FIG. 18

Window 1100 (job orders imported into current project)

| Products 13 | |
|---|---|
| | postcard1<br>138.94 mm x 95.25 mm<br>14pt Glossy 300 gram 0.4064<br>Ordered: 10000<br>Total 0 | product 1101 |
| | postcard2<br>138.04 mm x 95.25 mm<br>14pt Glossy 300 gram 0.4064<br>Ordered: 5000<br>Total 0 | product 1103 |
| | postcard3<br>130.56 mm x 168.86 mm<br>14pt Glossy 300 gram 0.4064<br>Ordered: 2000<br>Total 0 | product 1105 |
| | postcard4<br>177.8 mm x 122 mm<br>14pt Glossy 300 gram 0.4064<br>Ordered: 7000<br>Total 0 | product 1107 |
| | postcard5<br>63.64 mm x 132.43 mm<br>14pt Glossy 300 gram 0.4064<br>Ordered: 1800<br>Total 0 | product 1109 |
| | postcard6<br>106.93 mm x 138.94 mm<br>14pt Glossy 300 gram 0.4064<br>Ordered: 20000<br>Total 0 | product 1111 |
| | postcard7<br>152.04 mm x 101.5 mm<br>14pt Glossy 300 gram 0.4064<br>Ordered: 35000<br>Total 0 | product 1113 |

Products      Layouts      Files

FIG. 19

E-Mail Template 1601

Address Spreadsheet 1603

Import 1605

Create e-mail(s) 1607

Sent e-mail(s) 1609

FIG. 20

METHOD FOR MULTIFUNCTIONAL GRAPHICAL USER INTERFACE FILE INDICIA MOVEMENT, AND SYSTEM, TERMINAL AND COMPUTER READABLE MEDIA FOR THE SAME

TECHNICAL FIELD

The present disclosure relates to a method for improving the function of a computer graphical user interface.

BACKGROUND

Myriad industries and technical research endeavors demand human-to-data interactions, wherein human users manipulate and intelligently process various file types across a myriad of functionalities.

Graphical user interfaces (GUIs) can be connected to various input/output (I/O) devices such as a mouse or touch panel via a computer terminal. A file containing various types of computer data such as text, images, and sound as well as applications for performing computer-implemented operations are often represented visually on a GUI. Motions received at an associated I/O device can be represented visually on the GUI as well, and motions received at an I/O device can also be translated into various commands executed by a computer terminal.

Motions received at an I/O device and represented visually on a GUI associated with the computer terminal are sometimes referred to as "drag and drop" when a button click during a cursor-to-file overlap, plus a motion of the mouse, and then release of the button at a GUI target indicia, are translated into selection of the file and instantiation of a command with respect to the file.

The following additional references became known from one or more searches conducted in connection with a disclosure of the embodiments described herein. This patent document makes no assertion as to whether or not any particular reference constitutes "prior art" under the patent laws of the various jurisdictions for which patent protection is being sought. Copies are being provided in respective Patent Offices as part of an "Information Disclosure Statement" or equivalent in each jurisdiction:

U.S. Pat. No. 6,976,224 (Nii)
U.S. Pat. No. 9,104,300 (Brownholtz).
U.S. Pat. No. 9,886,188 (Saito).
U.S. Pat. No. 9,026,931 (Hackett).
US20070185832 (Kriebel)
U.S. Pat. No. 7,283,257 (Bright).
US20100275144 (Dejoras)
US20130275901 (Saas)

For example, U.S. Pat. No. 10,222,970 (Hartman) discloses a separate graphical indicator also known as a "drop socket" which denotes a singular graphical action to be performed on a selected object. The user initiates the drag and drop action by motion directed at the graphical region of the drop socket, and the specific action performed depends on which drop socket is selected. "Drop sockets" are an advantage or alternative to standard right click functionality in Microsoft® operating systems by allowing a user to drag and drop to initiate an action as opposed to displaying a list of actions when right clicking on a mouse. None of these references nevertheless allow a user to effectively handle various file types and action sequences.

It would be desirable therefore to provide a method that provides improved function at a graphical user interface.

SUMMARY

One aspect of the current disclosure is directed to a method, at a terminal having at least one associated graphical user interface(s)(GUI)(s) and at least one associated input/output (I/O) device, comprising one or more of the following: receiving input data, at the at least one I/O device(s) associated with and communicatively connected to the terminal, selecting one or more file objects displayed on the at least one associated graphical user interface(s); another or alternate aspect of the method includes retrieving, from a database stored on a computer-readable medium, parameters associated with one or more criteria for performing a sequence of one or more commands; another aspect or alternate of the method includes accessing properties of file(s) associated with the one or more file objects; another or alternate aspect of the method includes comparing the properties of the file(s) with the parameters associated with one or more criteria to determine which criteria are met; another or alternate aspect of the method includes retrieving, from a database stored on a computer-readable medium, sequences of one or more commands to be performed under specified conditions; another or alternate aspect of the method includes calculating the appropriate sequence of one or more commands by matching the met criteria to the specified conditions; another or alternate aspect of the method includes initiating the appropriate sequence of one or more commands to be performed on the file(s) represented by the displayed one or more file objects.

In another or alternate aspect, various overlays containing text and/or images are displayed on the GUI(s). Overlays can display the ordered sequence of designated commands that are going to be taken when the file objects are selected. Overlays can also be displayed where each region of the overlay on the graphical user interface window represents an alternative action list to perform.

Another or alternate aspect is directed to a terminal comprising at least one I/O device(s) associated with and communicatively connected to a terminal, arranged to select one or more file objects displayed on at least one associated graphical user interface(s) associated with the terminal. In another or alternate aspect, the terminal is associated with a database stored on a computer-readable medium, containing parameters associated with one or more criteria for performing a sequence of one or more commands. In another or alternate aspect, the terminal comprises at least one processor arranged to: access properties of file(s) associated with the one or more file objects; compare the properties of the file(s) with the parameters associated with one or more criteria to determine which criteria are met; retrieve, from the database stored on a computer-readable medium, parameters associated with sequences of one or more commands to be performed under specified conditions; compare the met criteria to the specified conditions triggering sequences of one or more commands; determine the appropriate sequence of one or more commands by matching the met criteria to the specified conditions; and initiate the appropriate sequence of one or more commands to be performed on the file(s) represented by the displayed one or more file objects.

In another or alternate aspect, a computer storage apparatus encodes a computer program, the program comprising instructions that when executed by data processing apparatus cause the data processing apparatus to perform operations, comprising receiving input data, at the at least one I/O device(s) associated with and communicatively connected to the terminal, selecting one or more file objects displayed on the at least one associated graphical user interface(s); retrieving, from a database stored on a computer-readable medium, parameters associated with one or more criteria for performing a sequence of one or more commands; accessing properties of file(s) associated with the one or more file objects; comparing the properties of the file(s) with the parameters associated with one or more criteria to determine which criteria are met; retrieving, from a database stored on a computer-readable medium, parameters associated with sequences of one or more commands to be performed under specified conditions; comparing the met criteria to the specified conditions triggering sequences of one or more commands; determining the appropriate sequence of one or more commands by matching the met criteria to the specified conditions; and initiating the appropriate sequence of one or more commands to be performed on the file(s) represented by the displayed one or more file objects.

BRIEF DESCRIPTION OF THE DRAWINGS

In the accompanying drawings, which form a part of the specification and are to be read in conjunction therewith, and in which like reference numerals are used to indicate like features in the various views:

FIG. 3 illustrates the designation and storage of criteria and commands at an I/O device connected to a computer terminal with an associated GUI, that may be used in embodiments;

FIG. 4 illustrates an application and operation system pairing detecting files selected for processing and categorizing the files by criteria to compute appropriate command sequences, that may be used in embodiments;

FIG. 5 illustrates receiving and storing criteria and/or commands at an application programming interface, which may be used in embodiments;

FIG. 18 illustrates a data table containing job orders;

FIG. 19 illustrates importing products into the current project; and

FIG. 20 illustrates a method of generating a document from a spreadsheet and a CSV file.

DETAILED DESCRIPTION

Figure 1:
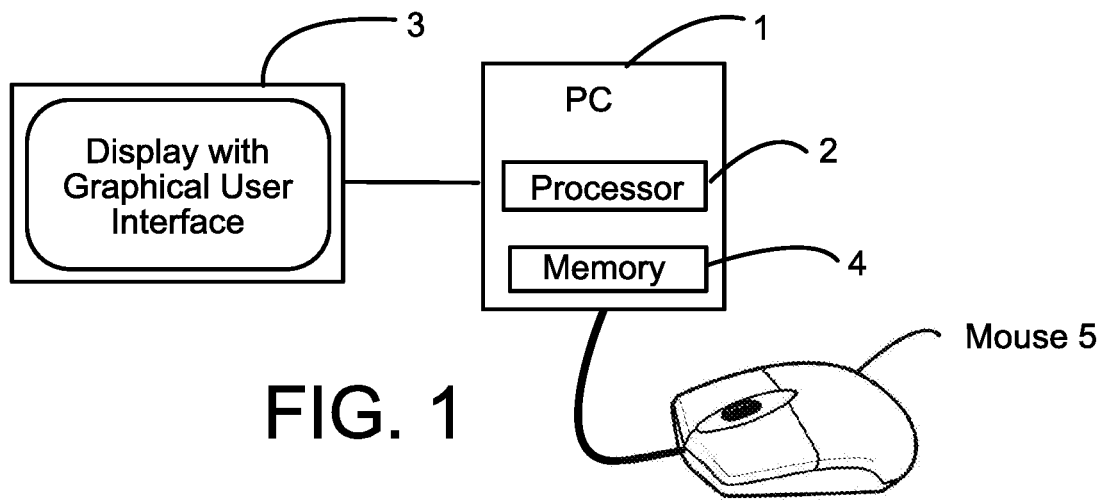
FIG. 1 is a schematic drawing of a computer terminal, associated input/output device such as a mouse, and associated monitor displaying a graphical user interface, with which embodiments may be implemented.

Embodiments of the present disclosure are concerned with instructions that are executed at a terminal to improve GUI display of dynamic I/O functionality for a variety of computer-implemented operation(s). Ultimately, though not in certain method, terminal, system and computer-readable media embodiments, these instructions may or may not also be executed at one or more server(s), storage device(s) or other computer hardware.

Operating systems and applications supporting drag and drop functionality do not typically give a clear indication to a user of what will happen when I/O inputs are received. For a relatively simple application and a single file type this limited functionality might not be a problem, but when applications have multiple views, states, or modes of operation, it becomes unclear what actions are going to be performed, if any, when external files are being dropped into an overlapping GUI target indicia. It is also often unclear what actions are going to be performed, if any, when multiple files are being dropped into the application represented by the destination GUI indicia, especially when a given operating system and application pairing otherwise performs different actions on any given file that is dragged and dropped. A user is not able to program a drag and drop operation to specify the commands to be performed. Dragging and dropping a file in an application can also result in failure of any commands to be performed when, for example, the file type is incompatible with the commands.

Applications that support drag and drop of multiple external files at the same time will often either process only one of the files or process all of the files in the same way as when each file is individually dragged and dropped by the operating system and application pairing. For example, importing three files into an e-mail application via drag and drop might result in three attachments getting added to a current e-mail being composed. Functionality is less consistent in situations when multiple files with different file formats are simultaneously dropped into an application that performs different actions depending on those file formats. In this case, applications might process each file independently like before, perform a single action on a file and ignore a file not compatible with that action, or present an error to the user.

The order in which files are processed by a target application is commonly not well defined since the order files are received within the application can depend on the environment of the operation such as a host operating system. For applications that can handle only a single file at a time, it can then be ambiguous as to which file will be chosen for processing. For applications that process multiple files or a folder containing multiple files, the order those files are processed can be ambiguous. This ambiguity can result in end users having to resort to less efficient approaches, like dropping files into a target application one-by-one or avoiding drag and drop altogether. Applications do not provide a way of allowing users to define what command is executed upon file data when files are "dropped into" a target application. This limitation makes it impossible to define different actions based on the current application state or view, or different actions based on the number of files being dropped into the application. This lack of control also makes it impossible to define an ordered list of possibly dependent actions in situations where multiple files with different file formats are dropped into an application. Users are not presented with a means of choosing non-default functionality during a drag and drop operation. This lack of control can also result in end users resorting to dropping files in one-by-one or avoiding drag and drop.

When applications have multiple views, states, or modes of operation, it becomes unclear what actions are going to be performed, if any, when an external file is dropped at an overlapping GUI target indicia. It is also unclear what actions are going to be performed, if any, when multiple files are being dropped into the application represented by the destination GUI indicia, especially when a given operating system and application pairing otherwise performs different actions on any given file that is dragged and dropped individually. In all the above cases, what commands are to be performed are not reported to the operator during a drag and drop operation.

Embodiments described herein thus address the above shortcomings of drag and drop functionality in a variety of manners. For example, many of the embodiments described herein accomplish one or more of (1) boosting user productivity in applications by addressing one or more of the above-indicated problems regarding the performance of drag and drop operations, (2) reducing the number of steps required to perform tasks, (3) providing new levels of control over drag and drop functionality based on an application context and/or the given data source(s), (4) reducing operator errors due to misunderstood or ambiguous functionality during drag and drop operations and (5) providing a fast, simple way to override one or more actions to be performed during the drag and drop operation(s).

As illustrated in FIG. 1, terminal 1 has associated graphical user interface ("GUI") 3. Terminal 1 comprises a processor 2 and memory 4. Terminal 1 may implement the methods described herein using customized hard-wired logic and/or program logic which cause or programs terminal 1 to be a special-purpose machine. The methods can be performed by terminal 1 in response to processor 2 executing instructions contained in memory 4. Execution of the instructions contained in memory 4 cause processor 2 to perform the processes described herein. There is also provided one or more input/output device(s) 5 ("I/O device") communicatively connected to terminal 1. The I/O device could be, for example, a display configured to respond to pressure applied, or a mouse configured to respond to pressing and/or holding.

Figure 2:
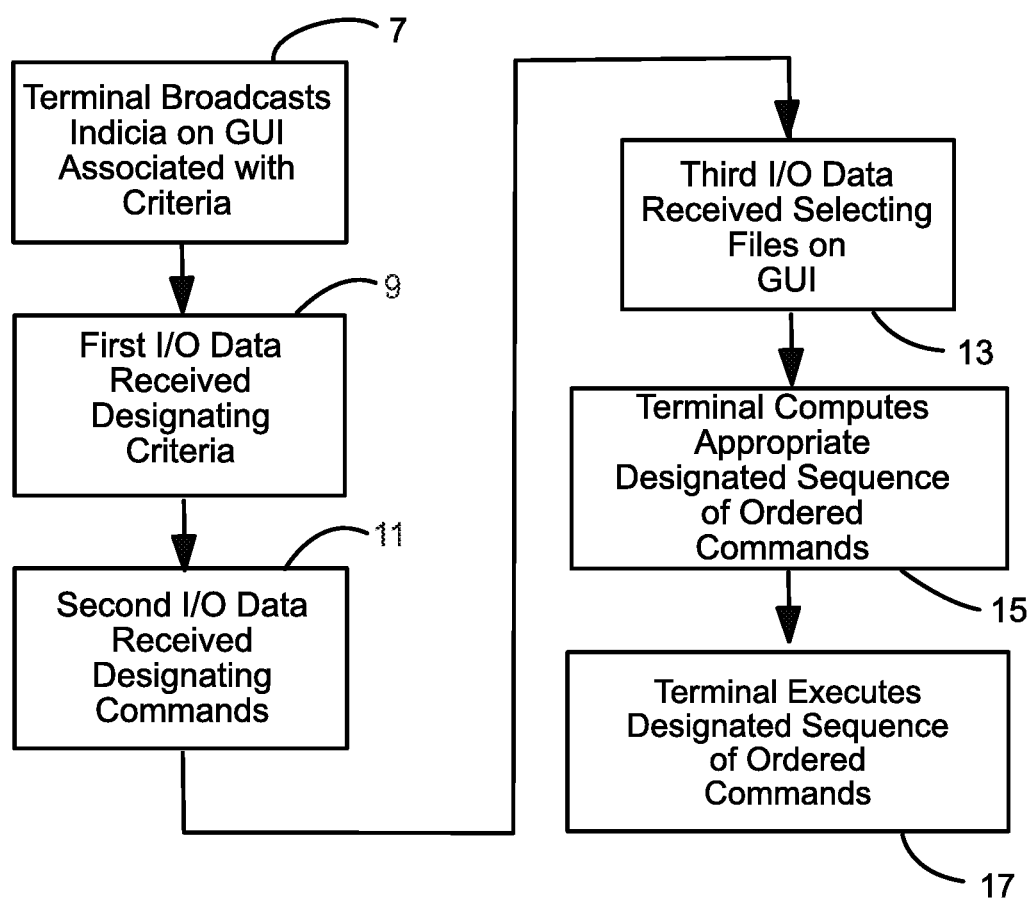
FIG. 2 is a flow diagram showing an exemplary operation following the selection of a file object at an I/O device connected to a computer terminal with an associated GUI, that may be used in embodiments.

As illustrated in FIG. 2, terminal 1 receives 7 I/O data 9 selecting one or more file object(s) on GUI 3 associated with terminal 1. Terminal 1 retrieves 9 parameters associated with one or more criteria from an associated database. Terminal 1 accesses 11 properties of the selected file object(s) and compares the file properties with the criteria retrieved. Terminal 1 retrieves 13 parameters associated with one or more command sequences to be performed under specified conditions from an associated database. Terminal 1 calculates 15 the appropriate sequence of commands by comparing the specified conditions with the criteria met by the selected file object(s). Terminal 1 executes 17 the appropriate sequence of commands (and optionally displays status of the commands as complete or incomplete).

As illustrated in FIG. 3, terminal 1 broadcasts 73 indicia associated with one or more criteria. The criteria can be, for example, file format, number of files, number of files per file format, size of the file, size of images in the file, number of pages, metadata tags, fonts, text languages, presence or absence of specific color(s) or color space(s), and/or presence or absence of certain vector shape(s). I/O data 75 designating criteria and/or commands are received. The commands can be, for example, renaming, saving, importing, printing, compressing, resizing, categorizing, matching, and/or reformatting. Terminal 1 associates 77 the appropriate designated sequence of commands with the criteria designated which match the specified conditions for one or more sequences of commands. Terminal 1 stores 79 the criteria, designated sequences of commands, and associations in the database.

In embodiments, terminal 1 broadcasts indicia associated with one or more criteria, including but not limited to: the file format(s) of the file(s) being dropped into the application; the total number of file(s) being dropped into the application; the number of file(s) being dropped into the application per file format; the size(s) of the file(s) being dropped into the application; file naming convention; pattern matching, regular express match, or similar; file metadata such as modification time or similar; some attribute(s) of the internal file contents such as image size, number of pages; metadata tags; fonts; text languages; presence or absence of specific colors or color spaces; presence or absence of certain vector shapes; the current context of the application, such as current application state, job state, mode of operation, or view; and/or some external context such as time of day, day of week, current locale, or similar.

In embodiments, terminal 1 broadcasts indicia associated with one or more commands, including but not limited to: importing or exporting file objects, printing (optionally, partial) contents of file objects, displaying (optionally, partial) contents of file objects, converting file objects into a different format, matching file objects with other file objects, showing icons or other visual representations of file objects, showing icons or other visual representations of commands, and/or positioning (optionally, partial) contents of file objects on a display or printed material.

In embodiments, commands performed can be dependent on the previous commands. Ordered sequences of designated commands are selected for execution based on criteria related to prior processes performed by terminal 1. Terminal 1 broadcasts text or images that represent the prior processes performed by terminal 1.

In embodiments, there are multiple ways to handle the case where terminal 1 calculates that none of the file object indicia match criteria associated with stored ordered sequences of designated commands. In some embodiments, a default ordered sequence of designated commands is performed. In other embodiments, no commands are performed. Optionally, terminal 1 broadcasts text or images that the indicia corresponding to criteria for the selected file object did not match the criteria associated with any of the ordered sequences of designated commands.

As illustrated in FIG. 4, application and operating system pairing detects 99 selected files via motion received at I/O device 5. Application and operating system pairing collects all files selected 101. Application and operating system pairing categorizes files by criteria 103. Criteria designated by motions received at I/O device 5 at a prior time are stored in memory 4. Application and operating system pairing compute appropriate designated sequence of ordered commands 105. Processor(s) 2 execute designated commands 107.

In embodiments, terminal 1 converts motion(s) received at I/O device 5 corresponding to movement displayed on GUI 3 into designations of the one or more commands. Terminal 1 stores the ordered sequence of designated commands on computer-readable media according to a naming convention. Commands can be designated by a web service API, command line interface, or direct configuration file editing, and then stored on computer-readable media according to a naming convention.

In embodiments, inputs are received via I/O device 5 which could be alphanumeric and other keys, cursor control such as a mouse, a trackball, or cursor direction keys, and/or a touch panel. According to the inputs received at the I/O device, including by way of an API, corresponding motion(s) in terminal 1's associated GUI are displayed, and particular commands can be instantiated by input received by processor 2, which could be a microprocessor.

As illustrated in FIG. 5, data defining criteria and/or commands can be received at terminal 1 by way of a linkage with application programming interface 84. Terminal 1 associates 77 criteria with commands and/or commands with criteria. Terminal 1 stores 79 criteria and/or commands along with the associations between criteria and commands in a database.

Figure 6:
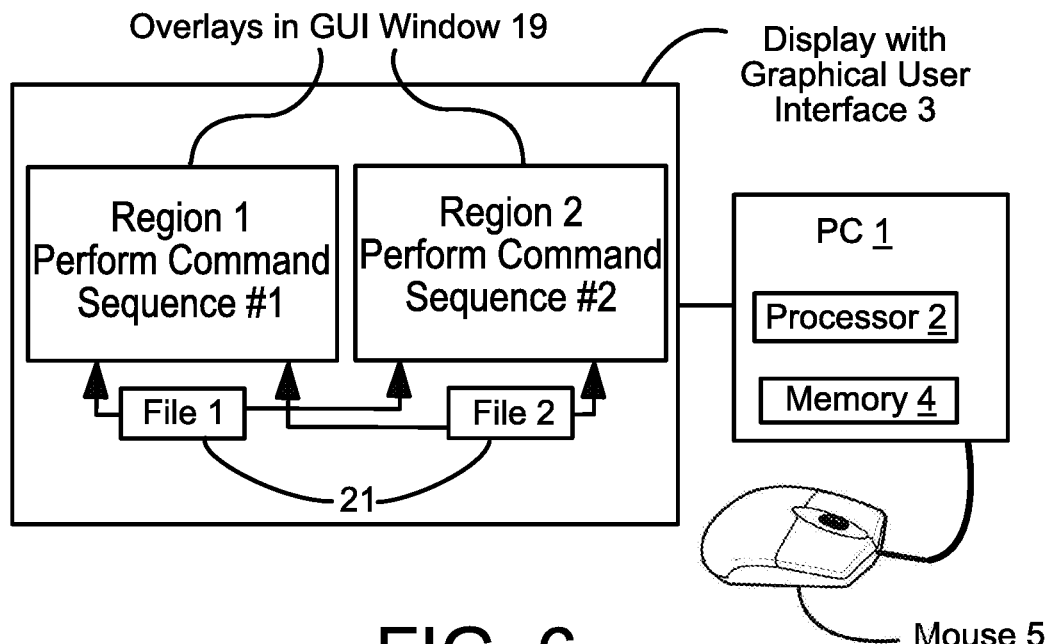
FIG. 6 illustrates an overlay in the graphical user interface providing different regions for the initiation of alternative ordered sequences of designated commands, which may be used in embodiments.

As illustrated in FIG. 6, terminal 1 has associated graphical user interface ("GUI") 3 and associated I/O device 5. Alternative lists of ordered commands are contained in memory 4 based on criteria defined at a previous time. In response to processor 2 executing instructions contained in memory 4, two or more spatial regions 19 representing alternative ordered lists of designated commands overlay GUI 3. One or more file objects 21 are visually depicted on the GUI. First motion(s) received at the I/O device 5 are transformed into a selection of one or more file objects 21. Second motion(s) received at the I/O device 5 are transformed into visual movement of file objects 21 on GUI 3. Visual movement of file objects 21 on GUI 3 into spatial regions 19 cause terminal 1 to execute corresponding designated sequences of ordered commands.

Figure 7:
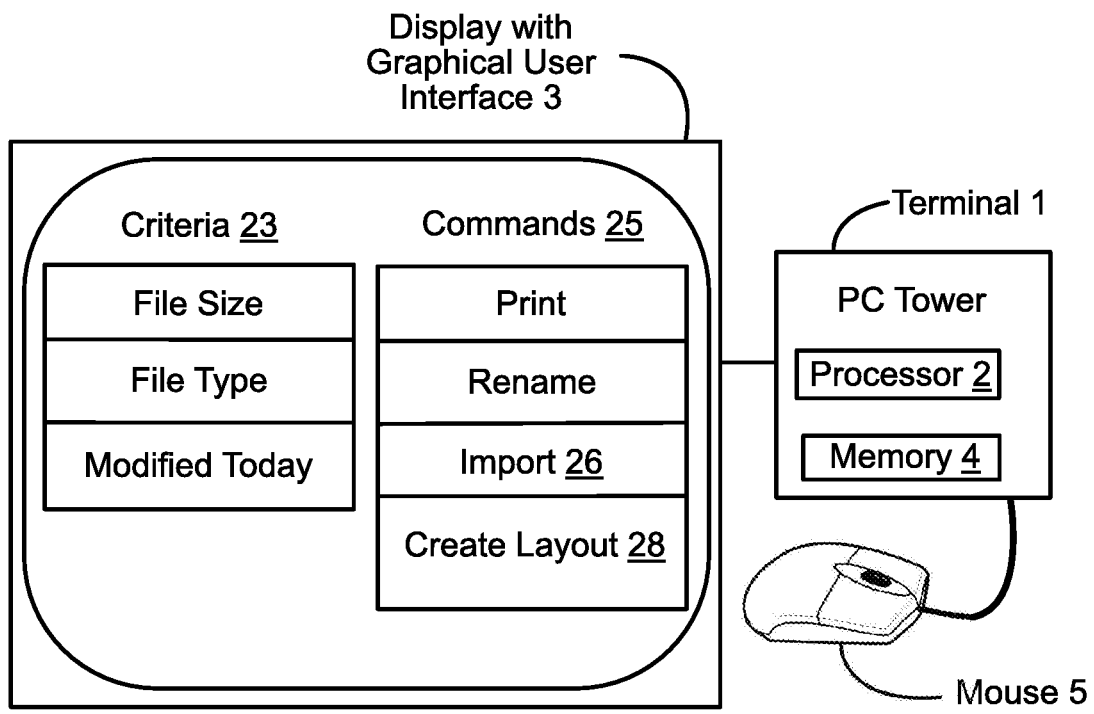
FIG. 7 illustrates a graphical user interface broadcasting criteria for choosing commands and designated commands, which may be used in embodiments.

As illustrated in FIG. 7, terminal 1, associated with GUI 3 and I/O device 5, can represent criteria and commands visually with text and/or images. Criteria can include, for example, file format, number of files, number of files per file format, size of the file, size of images in the file, number of pages, metadata tags, fonts, text languages, presence or absence of specific color(s) or color space(s), and/or presence or absence of certain vector shape(s). Commands can include, for example, renaming, saving, importing, printing, compressing, resizing, categorizing, matching, and/or reformatting. Criteria and commands to be displayed are stored in memory 4. First motion(s) received at the I/O device 5 are transformed into a selection of one or more criteria 23 or one or more commands 25. Processor 2 detects and stores the selections in memory 4.

In embodiments, terminal 1 converts motion(s) received at I/O device 5 corresponding to movement displayed on GUI 3 into designations of the one or more criteria. Terminal 1 stores the designations on computer-readable media according to a naming convention. Criteria can be designated by a web service API, command line interface, or direct configuration file editing, and then stored on computer-readable media according to a naming convention. Criteria may also be stored at a previous time on computer readable media, or criteria may not be used.

Figure 8:
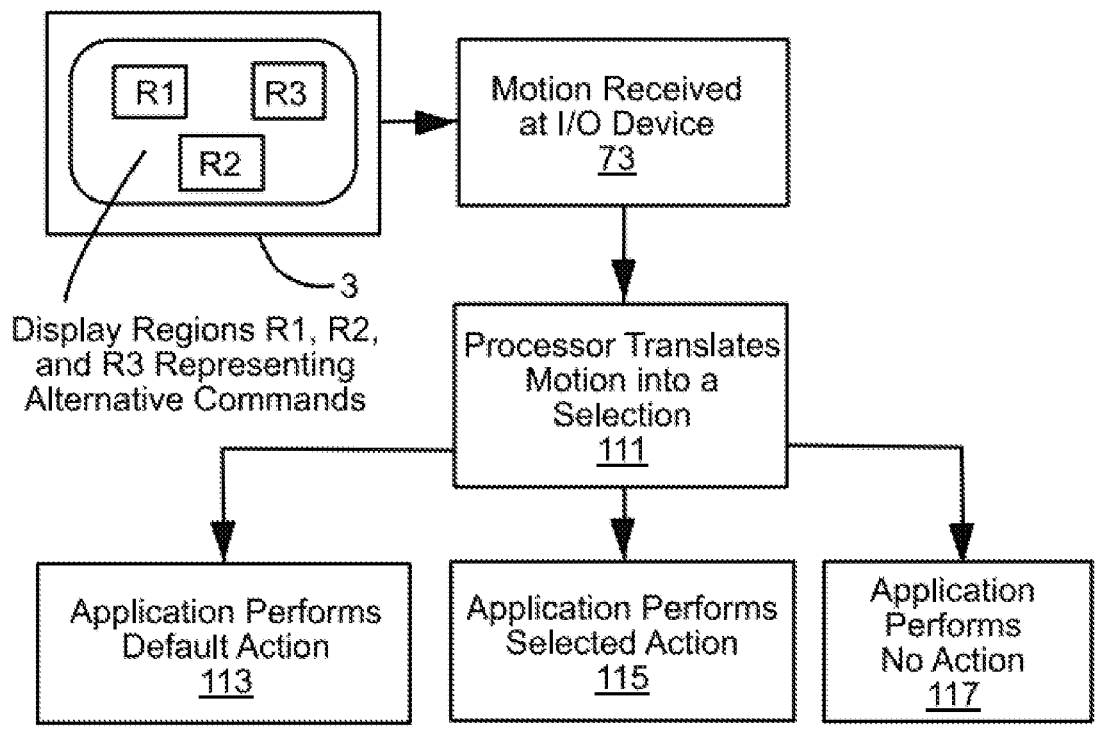
FIG. 8 illustrates a method of performing a default sequence of commands, an alternative sequence of commands, or no action, which may be used in embodiments.

As illustrated in FIG. 8, three or more regions are displayed on display 3. Alternative commands are instantiated depending on which region is selected by motion is received at I/O device 73. Processor(s) translate the motion(s) into a selection 111. Application and operating system pairing either perform default action 113, selected action 115, or no action 117.

In embodiments, terminal 1 broadcasts indicia of the one or more stored criteria and of the one or more stored commands. Motion(s) received at the I/O device join one or more stored criteria with one or more stored commands. In some embodiments, ordered sequences of designated commands are rank ordered so that the first ordered sequence of designated commands in the rank ordered list that matches designated criteria is immediately instantiated.

In embodiments, motion(s) received at the I/O device select one or more file objects displayed on the at least one GUI(s) associated with terminal 1. Terminal 1 accesses the selected file object data and compares the file object data indicia with the one or more stored criteria associated with ordered sequences of designated commands. In some embodiments, the first ordered sequence of designated commands in the rank ordered list that matches designated criteria is instantaneously executed. In other embodiments, the ordered sequence of designated commands with the most criteria matching is selected out of all the ordered sequences of designated commands where one or more criteria matches, and then is executed after the computation is complete.

In embodiments, terminal 1 optionally displays an overlay on top of a portion or all the GUI window(s). The overlay can contain textual and/or visual description of the ordered sequence of designated commands, including the commands that are to be executed. Overlay text and/or visual descriptions could also show details about how the ordered sequence of designated commands was computed, for example the list of matching criteria in the file object(s) indicia.

In embodiments, terminal 1 broadcasts each alternative ordered sequence of designated commands by a clearly delineated region in the overlay, for example a rectangular or circular area, with associated textual and/or visual descriptions of the each alternative ordered sequence of designated commands. In embodiments, terminal 1 selects the ordered sequence of designated commands for execution based on motion(s) received at the one or more associated I/O devices.

Figure 9:
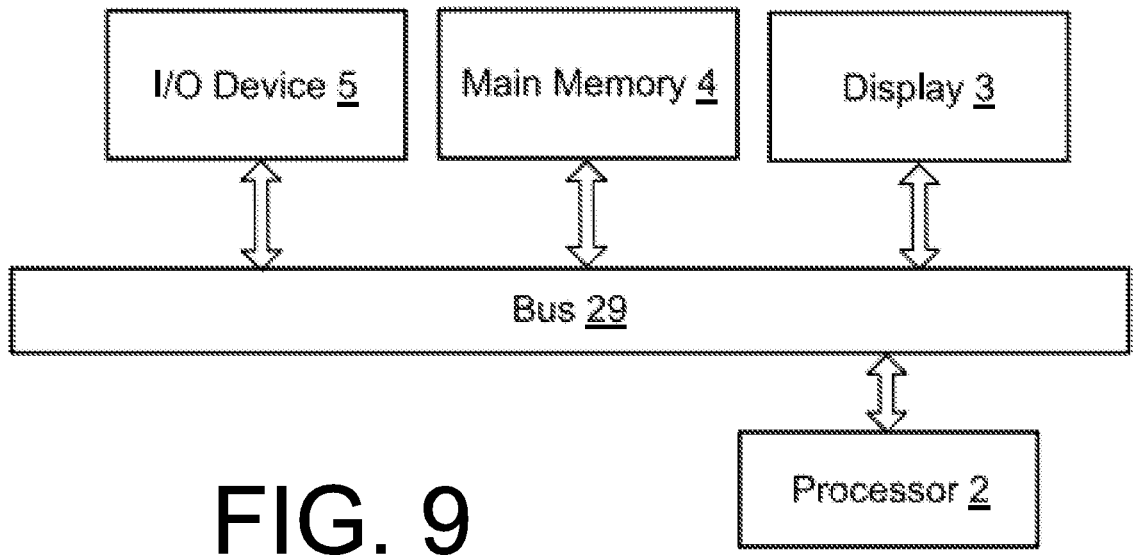
FIG. 9 illustrates a schematic of an example computer useful for implementing embodiments.

As illustrated in FIG. 9, embodiments can be implemented by bus 29, a communication mechanism for communicating information which can transmit data to memory 33 from which processor 31 draws instructions. Display 3 and I/O device 5 are connected via bus 29 to processor 2 and memory 4, and can also be connected to data storage device 35. I/O device 5 communicates information about motion received first to bus 29. Bus 29 communicates the information to processor 2. Bus 29 can also communicate information and instructions to storage device 35, which storage device can be, for example, a magnetic disk or optical disk, or solid state drive.

Example 1. In embodiments, one aspect of the present disclosure meets the specific demands required for high throughput printed substrate preparation. An example of a complex niche commercial computations requiring multiple steps such as opening files, saving files in a different location, moving files, performing various actions on files, and at times complex repetitive time-consuming manipulations of various files is printing, cutting, foiling, embossing, varnishing, and other related actions to produce items such as folding cartons, labels, signs, and books.

Figure 10:
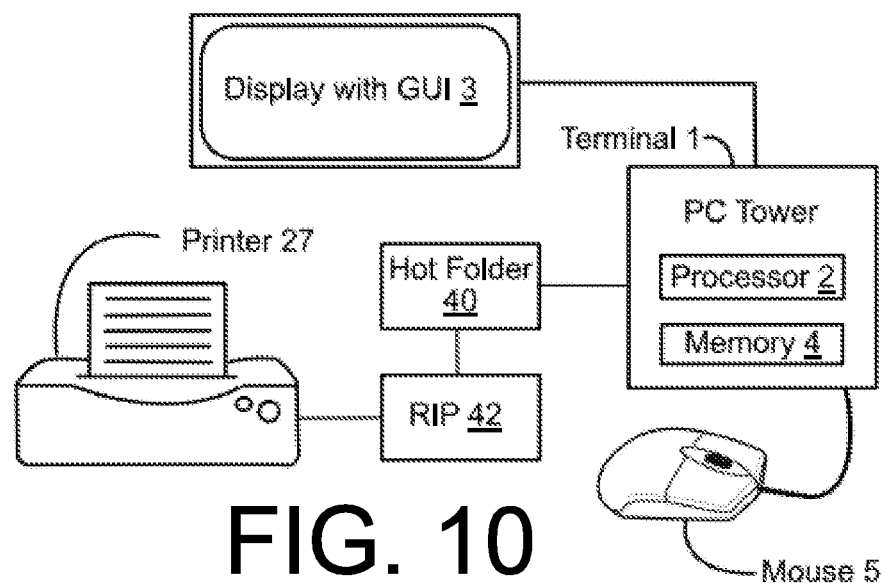
FIG. 10 illustrates a schematic drawing of a printer or other machinery for transforming articles connected to a computer terminal, associated input/output device such as a mouse, and associated monitor displaying a graphical user interface, with which embodiments may be implemented.

As illustrated in FIG. 10, terminal 1, associated with GUI 3 and I/O device 5, can be connected to machinery 27. Such machinery could be a printer, for example. Criteria for instantiating commands and designated commands are stored in memory 4. Execution of the instructions contained in memory 4 cause processor 2 to perform the processes described herein. First motion(s) received at I/O device 5 are represented visually on display 3. According to the first motion(s) received, processor 2 calculates the corresponding commands. Terminal 1 executes 17 a designated sequence of ordered commands calculated to cause the various parts of machinery 27 to maneuver in particular manners.

As used herein, a job order is an item that was ordered to be produced by a manufacturer. For example, a postcard, brochure, sign, box, or label. Job orders typically have names, order quantity (how many to produce), and can have other information like substrate name, dimensions, etc. A job order is also referred to as a product. As used herein, a layout template is a pre-defined layout of shapes and their positions. CAD files are an example of layout templates. Layout templates can also be defined as XML data like the JDF standard, or other open or data formats such as PDF or PostScript. Layout templates can represent an existing physical cutting die, but not necessarily. Layout templates are used whenever operators want to define the precise positions of items which can be useful for processes not involving die cutting. Layout templates do not contain job order quantities or names or job orders. As used herein, a layout defines all items and their positions for a single sheet or section of a roll. Layouts contain job order items and printing marks. Layouts can be defined or partially defined with a layout template, but layouts can also be created from scratch either manually or through an automatic imposition tool. As used herein, a project is a collection of job orders and layouts. A project file is an open or proprietary file containing job order and layout information.

Figure 11:
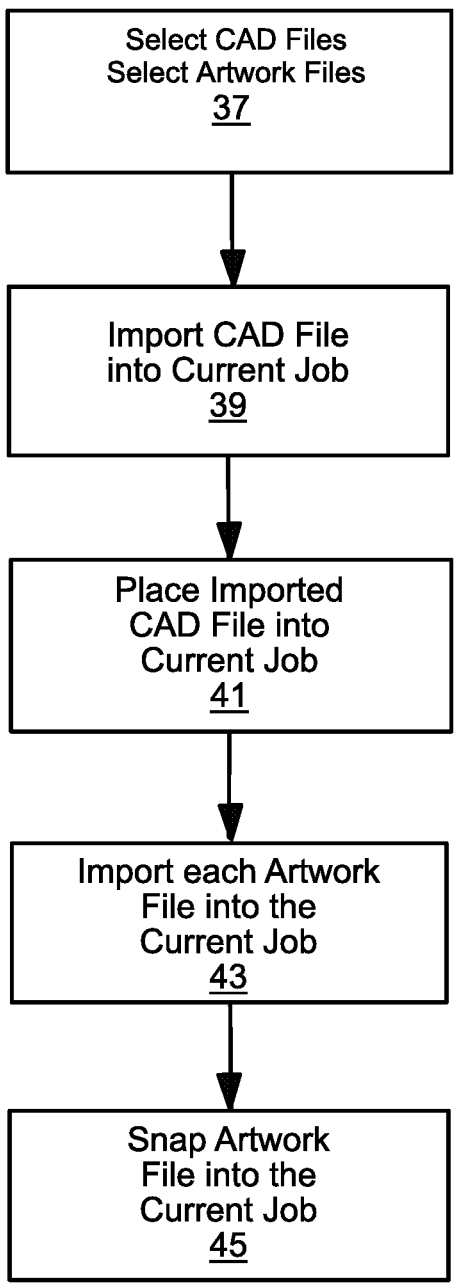
FIG. 11 illustrates an operation where file objects are a CAD file and one or more artwork file(s) and the commands cause artwork files to be placed into a job.

As illustrated in FIG. 11, terminal 1 selects CAD file(s) and artwork file(s) 37. The selection can be instantiated by I/O device 5. Terminal 1 imports the CAD file(s) into the current job 39. Terminal 1 places the imported CAD file(s) into the current job 41 according to instructions previously stored in memory 4 or storage device 35. In folding carton, corrugated, and label production, often metal dies are used that cut irregular shape items out of printed material during production. Terminal 1 imports each artwork file into the current job 43, and snaps the artwork into matching die positions 45. The artwork that is printed on the material needs to line up exactly with the die layout positions.

Figure 12:
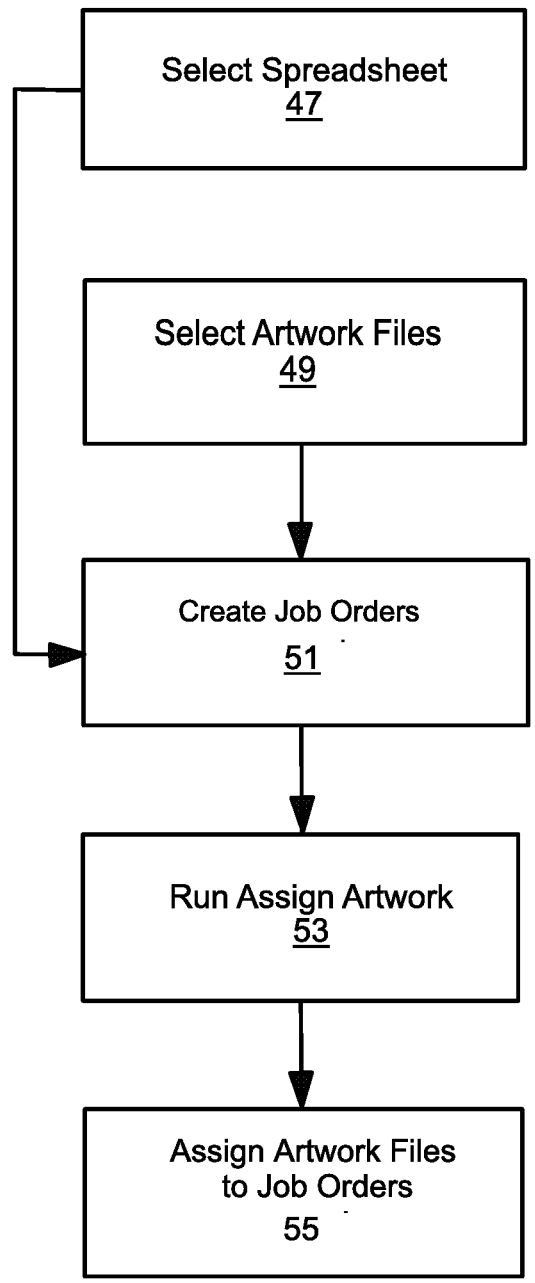
FIG. 12 illustrates an operation where file objects are a spreadsheet and one or more artwork file(s) and the commands cause artwork files to be assigned to job orders.

As illustrated in FIG. 12, terminal 1 selects spreadsheet 47 and artwork files 49. The selection can be instantiated by I/O device 5. Terminal 1 creates job orders 51. Terminal 1 runs a routine, which could be named Assign Artwork 53. For example, a common operation for a pre-press operator is to import orders from a spreadsheet or XML file (typically exported from a MIS or CRM system) and then match up artwork files with each job order before imposing the orders onto layouts for production purposes. The routine automatically assigns artwork files to job orders 55.

Figure 13:
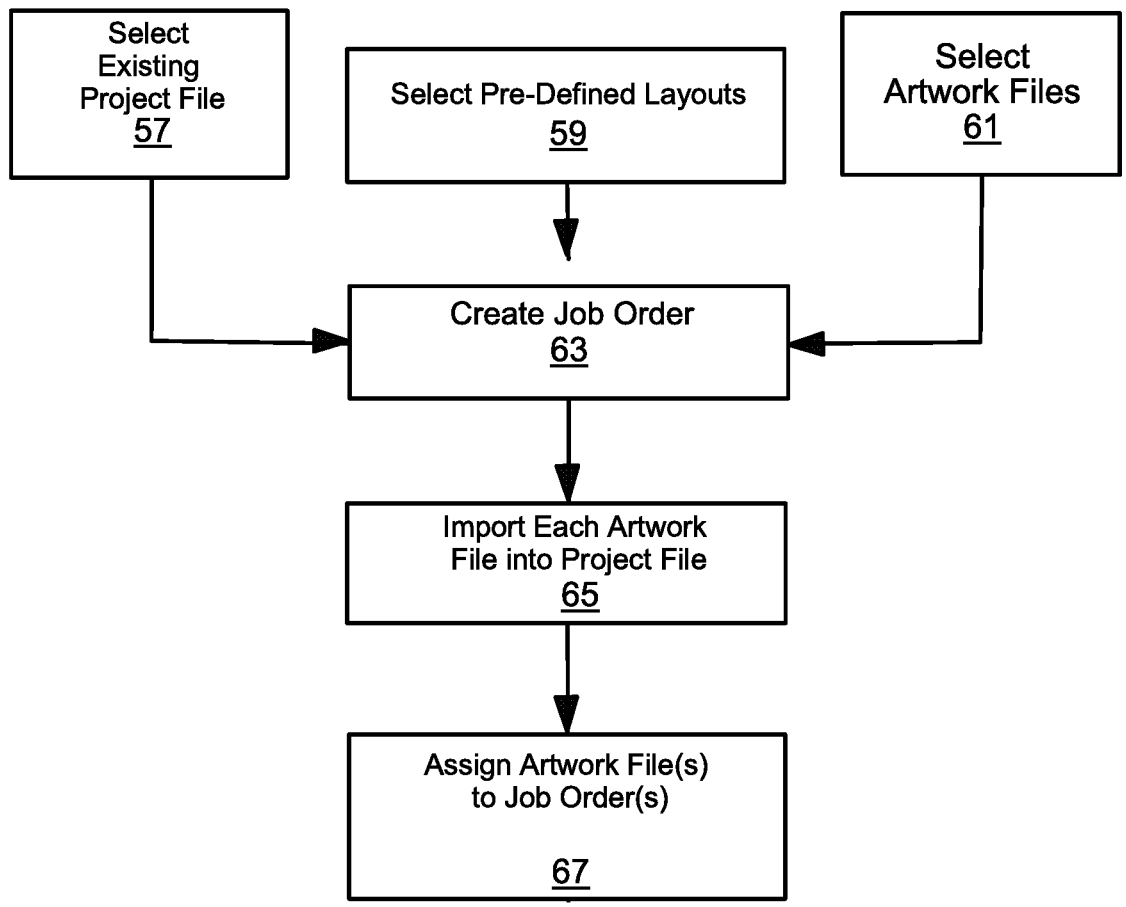
FIG. 13 illustrates an operation where file objects are a CAD file and one or more artwork file(s) and the commands cause artwork that is printed and/or cut on material to line up with die layout positions.

As illustrated in FIG. 13, artwork file(s) 61 and existing project file 57 containing one or more job order(s) and pre-defined layouts are selected. The selection can be made by a variety of means such as an I/O device like a mouse or over a wired or wireless digital communications network. Job order(s) are created 63. Each artwork file is imported into job order(s) 65. Artwork file(s) are assigned to job order(s) 67 based on matching shape(s) (auto snap) or file naming convention(s).

Figure 14:
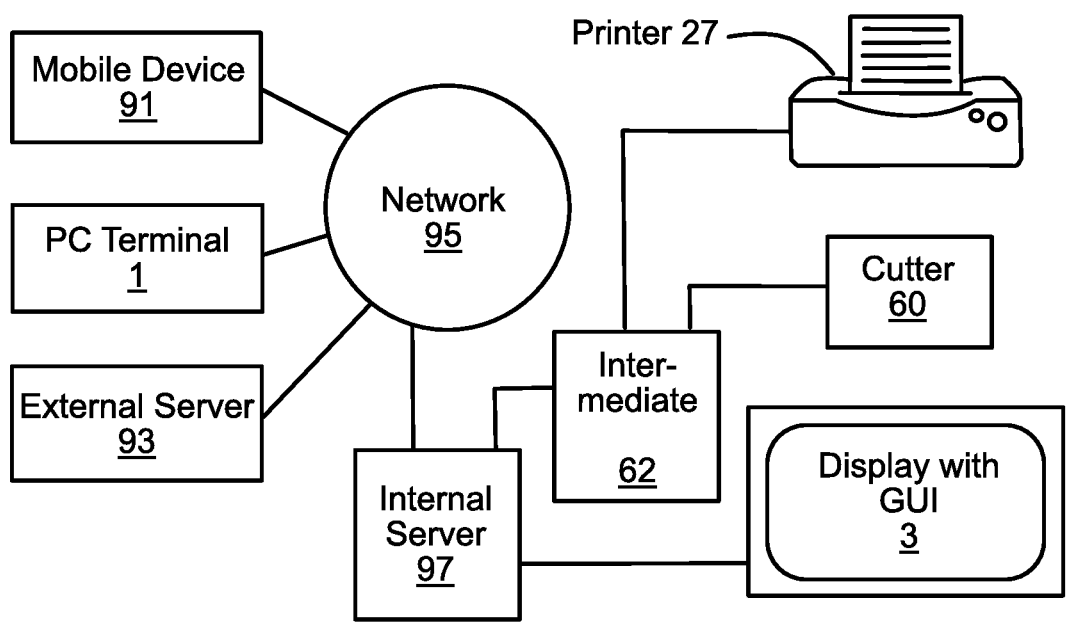
FIG. 14 illustrates a computer network for transmitting instructions to and from a terminal and other connected machinery, which may be used in embodiments.

As illustrated in FIG. 14, network 95 is connected to one or more terminals such as mobile device 91, terminal 1, or external server 93. Network 95 can be used for transmitting instructions. Network 95 is connected to internal server 97. Internal server 97 can be connected to printer 27 and/or display 3. Internal server 97 can transmit designated sequence of ordered commands calculated to cause the various parts of machinery 27 to maneuver in particular manners. For example, two-dimensional or three-dimensional cuts or markings can be made.

Figure 15:
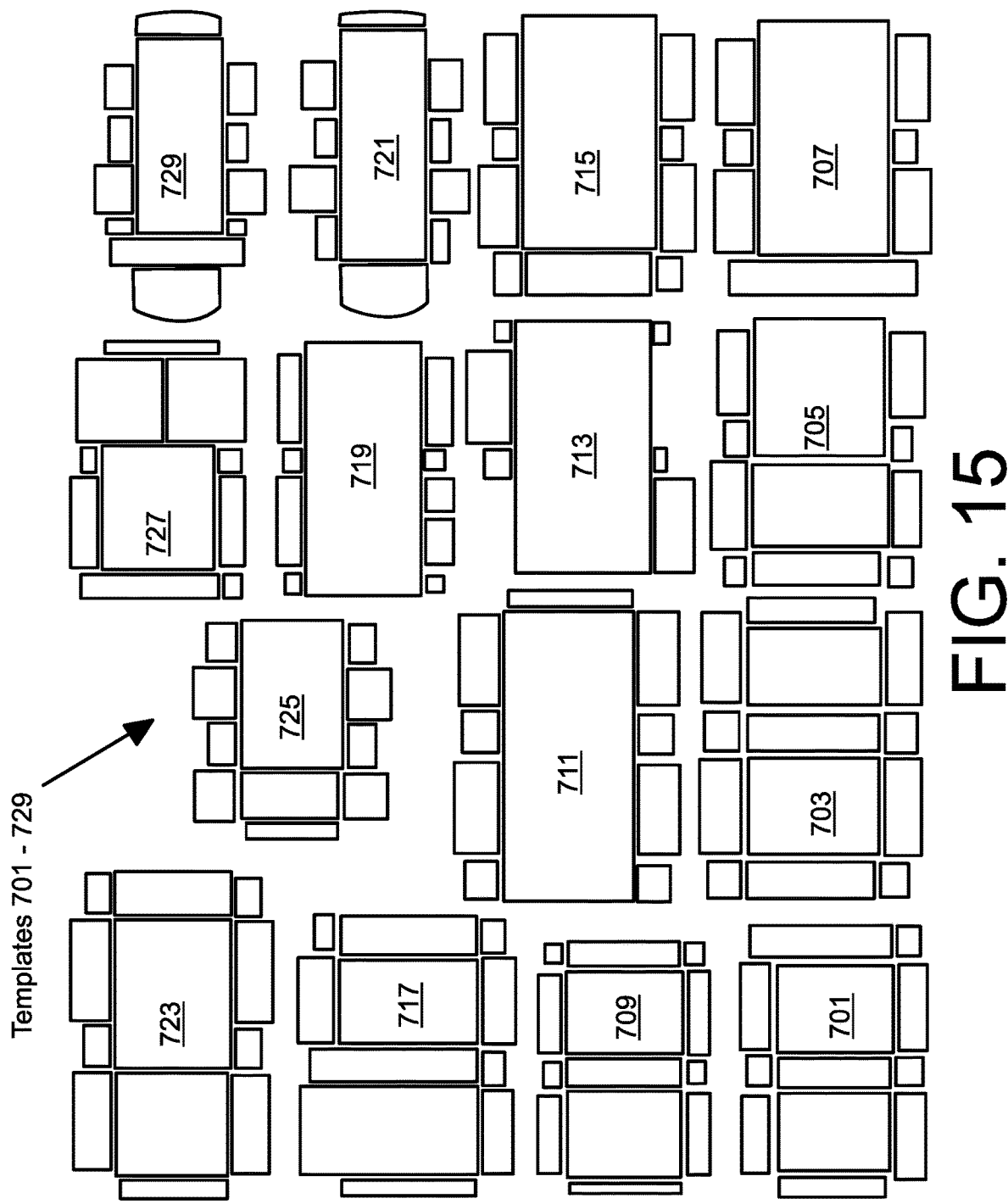
FIG. 15 illustrates a layout template for aligning one or more objects according to one or more previously defined criteria.

As illustrated in FIG. 15, products 701-729 of different shapes and sizes are arrayed according to criteria set at some prior time on layout template 700. A template, CAD file, and artwork files are all imported at the same time. Terminal 1 automatically executes a designated sequence of ordered commands which imports the CAD file defining layout template 700. Terminal 1 imports layout template 700 from a file (e.g. CAD file), imports artwork files (e.g. PDFs or image formats) at the same time, and auto-snaps the artwork into positions on layout template 700. Terminal 1 places the imported CAD layout onto a sheet in layout template 700. Terminal 1 imports a layout template file into a current project. Terminal 1 places the imported layout template 700 into a layout in the project. Terminal 1 imports artwork files into the current project. Terminal 1 imports auto-snaps each artwork file into layout template 700 based on the one or more criteria defined at a previous time. Terminal 1 assigns each artwork file or artwork page to a position in the placed layout template 700 based on the shape of the file or other predefined criteria. According to criteria and commands selected at some prior time, all these steps can be performed in a single drag and drop operation A project file with a pre-defined layout may contain the layout dimensions, printing marks, and other information about the project. Layout dimensions and printing marks that are needed in production are contained in the layout. Designated commands to be executed when dropping a project file together with a layout template, and artwork files are selected at a prior time. Terminal 1 accesses existing project file containing job orders and, optionally, layouts. Terminal 1 imports a layout template file into the current project. Terminal 1 places the imported layout template into a layout in the project. Terminal 1 imports artwork files into the current project. Terminal 1 assigns each artwork file or artwork page to a position in the placed layout template.

Figure 16:
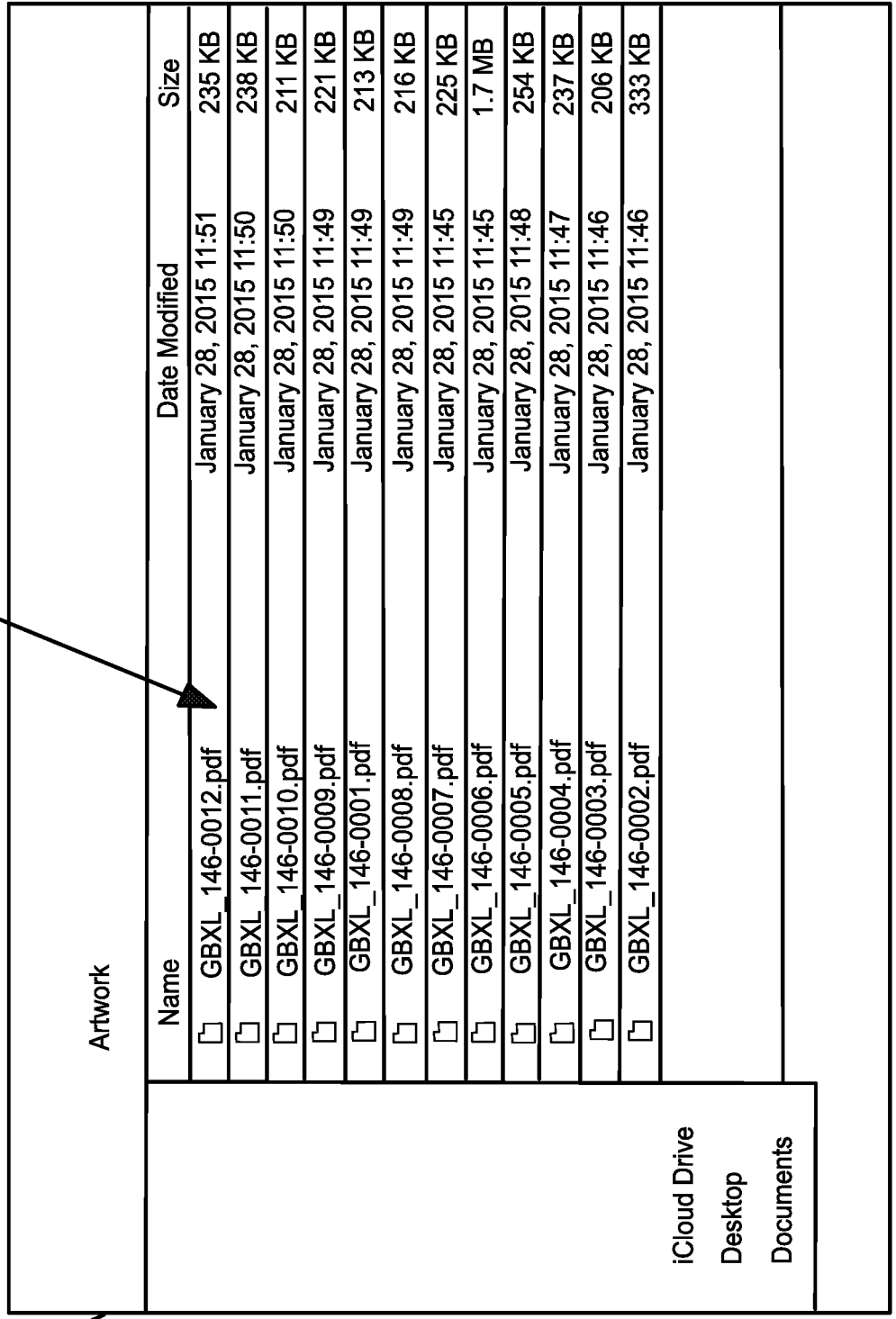
FIG. 16 illustrates a window containing one or more file objects on a graphical user interface and one or more applications.

As illustrated in FIG. 16, window 801 displays files 803. Files 803 are processed by application 805. According to criteria and commands selected at some prior time, all action taken by application 805 upon files 803 is performed in a single drag and drop operation. In embodiments, files can be imported, arrayed on a layout created according to predefined criteria, and then exported for printing and/or cutting. Files can be saved directly into a hot folder that is picked up by an RIP and then sent to the printer. Action can be sequential or all at one time.

In embodiments, terminal 1 is communicatively connected to one or more other machine(s) with the ability to transform things into a different state or thing. Terminal 1 converts motion(s) received at the I/O device to a visual representation on the one or more associated GUI(s). For example, one or more artwork files are imported, and according to the applicable designated sequence of ordered commands instructions for the positioning of one or more cutting dies are transmitted from terminal 1. Importing files causes the transmission of instructions for the positioning of one or more artwork data in relation to an existing template or cutting die pattern. A spreadsheet with data and one or more artwork files is imported. Artwork files are automatically assigned to positions based on the data in the spreadsheet. A template can be used that might have pre-defined sets of printing marks or barcodes or specific layouts to use.

In embodiments, a folder serves as a staging area for some purpose, known as a hot folder. The hot folder is continuously monitored, and when files are copied or dropped into it, they are automatically processed.

Figure 17:
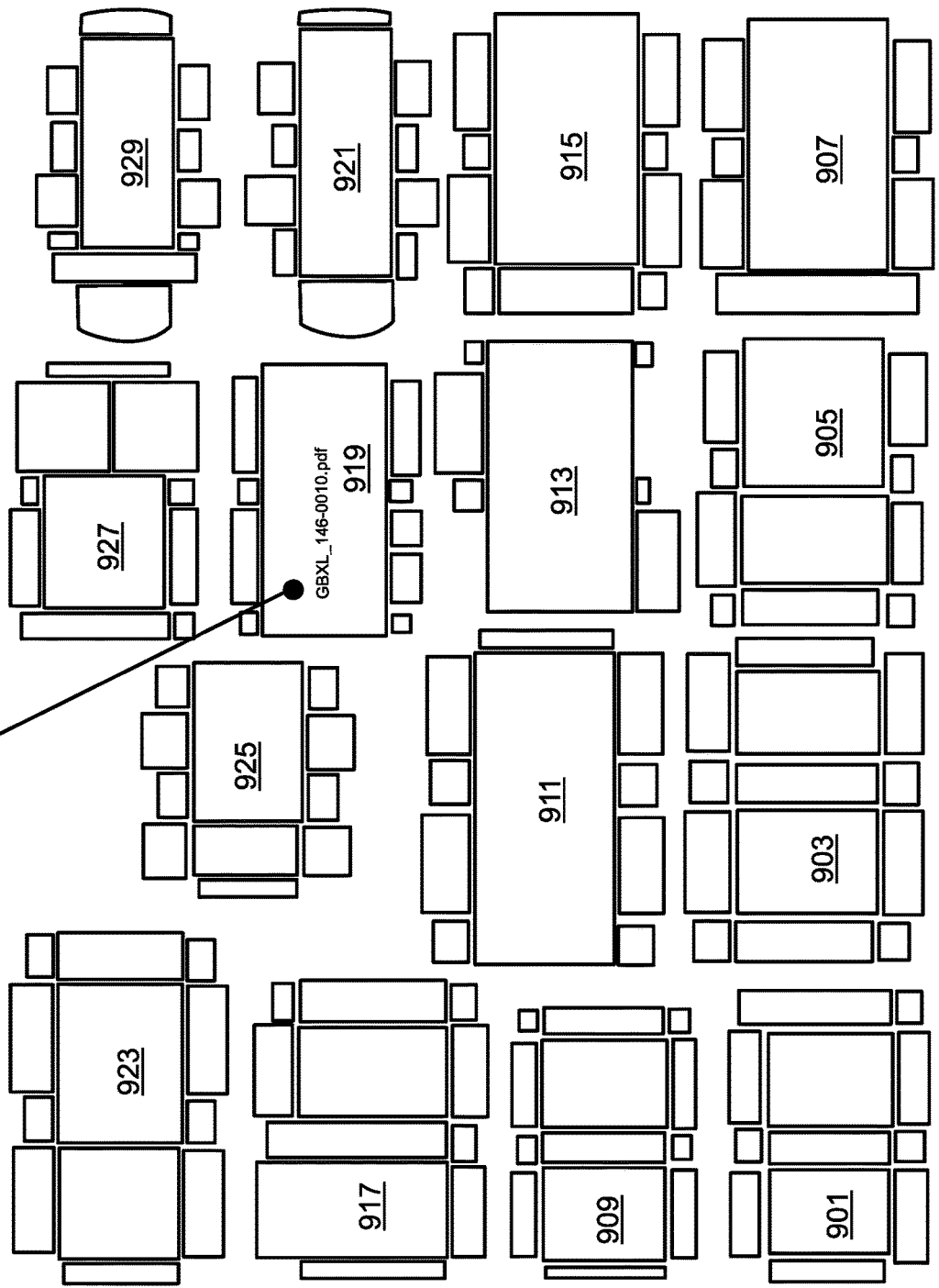
FIG. 17 illustrates artwork files assigned to layout template positions.

As illustrated in FIG. 17, terminal 1 automatically executes a designated sequence of ordered commands which imports the CAD file defining layout template 700. Terminal 1 imports a layout template from a file (e.g. CAD file), imports artwork files (e.g. PDFs or image formats), and auto-snaps the artwork into positions on layout template 700. Terminal 1 auto-snaps each artwork file into layout template 700. Terminal 1 assigns each artwork file or artwork page to a position in the placed layout template based on the shape of products 901-929 or other predefined criteria. According to criteria and commands selected at some prior time, all these steps can be performed in a single drag and drop operation.

As illustrated in FIG. 18, a spreadsheet including job order information and artwork files are associated with individual job orders based on file naming conventions. Terminal 1 imports job orders into a project and then (immediately or sometime later) assigns artwork files to the job orders. Terminal 1 imports job order information into the current Project. Information could be defined in a spreadsheet (e.g. CSV, Excel), XML data, or other text-based format. Terminal 1 executes "Assign Artwork" to match artwork files to job orders by filename match. According to criteria and commands selected at some prior time, all these steps can be performed in a single drag and drop operation.

As illustrated in FIG. 19, products 701-729 are displayed on window 1100. Products 701-729 can vary in size, shape, substrate, thickness, glossiness, color, and/or pattern. Products 701-729 are ready for production. Connectivity to a printing (or cutting/embossing/foiling) device could be direct or could involve other intermediate steps. For example, operators can manually copy or move the output to a device or to another part of the workflow or the output can be saved into a hot folder that picks up the output files automatically. Also, output from our application can be further transformed into a different format that is suitable for the device (like converting PDF or JDF to TIFF via a RIP process).

Example 2. Certain organizations send large numbers of e-mails for marketing or other purposes to a list of addresses, which can be maintained in a spreadsheet. E-mail clients such as Microsoft Outlook® provide the ability to create e-mail template files which store e-mail content and formats that a user might want to reuse for multiple e-mails to the same or different recipients. However, even once a template file is created, time-consuming manual steps are necessary to address and send e-mails to desired recipients. The present disclosure enables many e-mails to be sent by dropping a template file and a spreadsheet with fields defining sender, recipients, and other fields that can be replaced in the email template such as first name, last name and subject.

Figure 20:
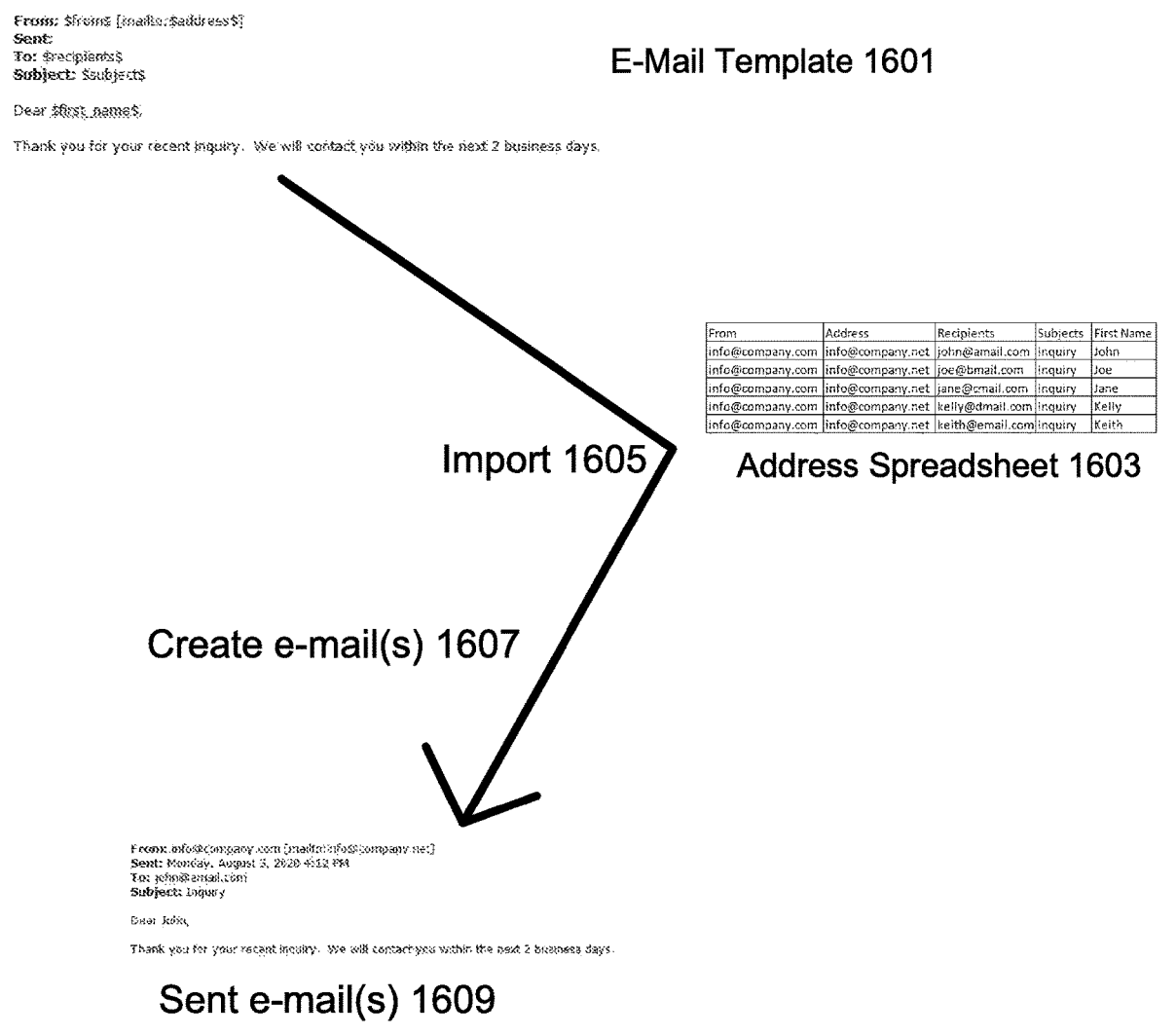

As seen in FIG. 20, e-mail template file 1601 and address spreadsheet 1603 are imported at the same time, which initiates a previously defined designated sequence of ordered commands. Address spreadsheet 1603 contains at least sender and recipient data, and may contain other data such as first name, last name, e-mail subject, and other fields which can be replaced in template file 1601. All entries from spreadsheet 1603 create emails conforming to the template for each entry in spreadsheet 1603. Sent e-mail(s) 1609 can then be automatically sent to the recipients defined in address spreadsheet 1603.

In embodiments, processes can be implemented by one or more special-purpose computing devices. The special-purpose computing devices may be hard-wired to perform the processes, or may integrate digital computing devices such as one or more application-specific integrated circuits (ASICs) or field programmable gate arrays (FPGAs) that are programmed to perform the processes.

In embodiments, one or more processors can be programmed to execute the processes from instructions in firmware, memory, other storage, or a combination. Special-purpose computing devices may also integrate hard-wired logic, ASICs, or FPGAs with programming to execute the processes. The special-purpose, processor-based computing devices may be desktop computers, laptops, mobile devices, servers, network devices or any other device that incorporates hard-wired and/or programmed logic to execute the processes.

In embodiments, an I/O device can include a mouse, touch panel, keyboard, microphone, video camera, CD-ROM, DVD-ROM, USB flash drive, and/or a remote computer communicatively connected to the terminal via a web service API, command line interface, or direct configuration file editing In embodiments, storage media and storage devices can be any non-transitory media that store data and/or instructions. Storage media may comprise non-volatile media and/or volatile media. Non-volatile media can include, e.g., optical or magnetic disks. Storage media and storage devices can be used with transmission media. Transmission media can transfer information between storage media and storage devices. Transmission media may comprise, e.g., coaxial cables, copper wire and fiber optics. Transmission media can also be acoustic or light waves, such as radio-wave and infra-red data transmissions.

In embodiments, media may be involved in transmitting instructions to one or more processor(s) for execution. The instructions can be stored on a magnetic disk or solid state drive. The instructions can be sent over a telephone line using a modem. A detector can transduce the data and place the data on a bus. A bus can transmit the data to a memory, from which a processor draws instructions. The instructions may be stored on storage device either before or after a processor executes the instructions.

In embodiments, one or more computer-readable media may contain programming, which can be executed by one or more processors to enable, allow or cause a terminal and/or system to perform the methods comprising any one or more of its various embodiments described above or otherwise covered by the appended claims.

In embodiments, the one or more computer-readable media can be non-transitory media, including, but not limited to, hard disk and solid state disk drives, thumb and other flash drives, DVDs, CDs, static and dynamic storage devices and other numerous storage media.

In embodiments, the one or more computer-readable media can comprise or be one or more transitory electronic signals.

The following numbered clauses set forth various embodiments of the disclosure:

1. At least one
   (a) computer-implemented method, or
   (b) terminal by way of (i) at least one processor; and at least one memory storing instructions executed by the at least one processor, (ii) means for or (iii) software module(s) for performing operation(s), or
   (c) system by way of (i) at least one processor; and at least one memory storing instructions executed by the at least one processor (ii) means for or (iii) software module(s) for performing operations(s), or
   (d) signal, or
   (e) transitory or non-transitory computer-readable medium containing instructions which when executed by one or more computers each or collectively comprising one or more processors cause operation(s),
   according to any one or more of the preceding clauses, the operation(s) comprising:
   (1) receiving input data, at the at least one I/O device(s) associated with and communicatively connected to the terminal, selecting one or more file objects displayed on the at least one associated graphical user interface(s);
   (2) retrieving, from a database stored on a computer-readable medium, parameters associated with one or more criteria for performing a sequence of one or more commands;
   (3) accessing properties of file(s) associated with the one or more file objects;
   (4) comparing the properties of the file(s) with the parameters associated with one or more criteria to determine which criteria are met;
   (5) retrieving, from a database stored on a computer-readable medium, sequences of one or more commands to be performed under specified conditions
   (6) calculating the appropriate sequence of one or more commands by matching the met criteria to the specified conditions; and
   (7) initiating the appropriate sequence of one or more commands to be performed on the file(s) represented by the displayed one or more file objects.

8. A method, terminal, system, signal or, transitory or non-transitory computer-readable medium according to any one or more of the preceding clauses, further comprising:
   broadcasting indicia associated with one or more criteria on the at least one associated graphical user interface(s);
   receiving input data at the at least one I/O device(s) designating one or more criteria associated with specified conditions for performing a sequence of one or more commands;
   storing, in a database stored on a computer-readable medium, parameters associated with one or more criteria associated with specified conditions for performing a sequence of one or more commands.

9. A method, terminal, system, signal or, transitory or non-transitory computer-readable medium according to any one or more of the preceding clauses, further comprising:
   broadcasting indicia associated with one or more commands on the at least one associated graphical user interface(s);
   receiving input data at the at least one I/O device(s) designating sequences of one or more commands to be performed under specified conditions;
   storing, in a database stored on a computer-readable medium, sequences of one or more commands to be performed under specified conditions.

10. A method, terminal, system, signal or, transitory or non-transitory computer-readable medium according to any one or more of the preceding clauses, further comprising:
    receiving, at an application programming interface, data containing parameters designating one or more criteria;
    storing, in a database stored on a computer-readable medium, the parameters associated with one or more criteria for performing a sequence of one or more commands.

11. A method, terminal, system, signal or, transitory or non-transitory computer-readable medium according to any one or more of the preceding clauses, further comprising:
    receiving, at an application programming interface, data containing parameters designating sequences of one or more commands;
    storing, in a database stored on a computer-readable medium, the parameters associated with sequences of one or more commands to be performed under specified conditions.

12. A method, terminal, system, signal or, transitory or non-transitory computer-readable medium according to any one or more of the preceding clauses wherein specified conditions calling for a sequence of commands include previously executed commands in addition to criteria associated with file properties.

13. A method, terminal, system, signal or, transitory or non-transitory computer-readable medium according to any one or more of the preceding clauses further comprising providing a graphical user interface wherein the orders of the sequence of commands are moveable based on one or more motion(s) received at the I/O device.

14. A method, terminal, system, signal or, transitory or non-transitory computer-readable medium according to any one or more of the preceding clauses, further comprising displaying an overlay onto the graphical user interface with text describing the sequence of commands that are predicted based on file properties to be taken when the file objects are selected.

15. A method, terminal, system, signal or, transitory or non-transitory computer-readable medium according to any one or more of the preceding clauses, further comprising presenting spatial regions within an overlay in the graphical user interface where each region represents an alternative action list to perform.

16. A method, terminal, system, signal or, transitory or non-transitory computer-readable medium according to any one or more of the preceding clauses, further comprising presenting images or text describing the status of the appropriate sequence of one or more commands to be performed on the file(s) represented by the displayed one or more file objects.

17. A method, terminal, system, signal or, transitory or non-transitory computer-readable medium according to any one or more of the preceding clauses, wherein wherein the criteria comprise one or more of:

file format(s) of the file(s),
size of the file(s);
conventions related to the name of the file(s);
an external context such as time of day, day of week, or geolocation;
a status of a window or application;
number of file(s):
storage location of the file(s):
size of image(s) in the file(s);
number of page(s) in the file(s);
metadata tags in the files such as modification times or authors,
fonts in the files;
text languages in the files;
presence or absence of specific colors or color spaces in the files: and
presence or absence of certain vector shape(s) in the files.

18. A method, terminal, system, signal or, transitory or non-transitory computer-readable medium according to any one or more of the preceding clauses, further comprising outputting image data that are used to print on a substrate.

19. A method, terminal, system, signal or, transitory or non-transitory computer-readable medium according to any one or more of the preceding clauses, wherein the appropriate sequence of one or more commands generates output data that is used to drive machines that perform printing, cutting, foiling, embossing, varnishing, and other related actions to produce items such as folding cartons, labels, signs, and books.

20. A method, terminal, system, signal or, transitory or non-transitory computer-readable medium according to any one or more of the preceding clauses, wherein the appropriate sequence of one or more commands causes one or more machine(s) to export a CAD, PDF, or vendor-specific file that gets saved into a hot folder in a system that drives a cutting device.

21. A method, terminal, system, signal or, transitory or non-transitory computer-readable medium according to any one or more of the preceding clauses, wherein the appropriate sequence of one or more commands snaps artwork into the matching die positions of the CAD layout on a sheet.

22. A method, terminal, system, signal or, transitory or non-transitory computer-readable medium according to any one or more of the preceding clauses, wherein:
the selected one or more file objects are a CAD file or other layout template and one or more artwork file(s); and
the appropriate sequence of one or more commands to be performed on the files comprises:
importing a CAD file defining a layout template into the current project;
placing the imported layout template into a layout in the project;
importing artwork files into the current project; and
assigning each artwork file or artwork page to a position in the placed layout template.

23. A method, terminal, system, signal or, transitory or non-transitory computer-readable medium according to any one or more of the preceding clauses, wherein:
the selected one or more file objects import job order information defined in a spreadsheet (e.g. CSV, Excel), XML data, or other text-based format into the current project; and
the appropriate sequence of one or more commands to be performed on the files comprises a subroutine matching artwork files to job orders by file name match.

24. A method, terminal, system, signal or, transitory or non-transitory computer-readable medium according to any one or more of the preceding clauses, wherein:
the selected one or more file objects are an existing project file with a pre-defined layout that may contain the layout dimensions, printing marks, and other information about the project and a CAD file defining a layout template; and
the appropriate sequence of one or more commands to be performed on the files comprises:
opening the existing project file containing job orders or layouts;
importing a CAD file into the current project defining a layout template;
placing the imported layout template into a layout in the project;
importing artwork files into the current project; and
assigning each artwork file or artwork page to a position in the placed layout template.

25. A method, terminal, system, signal or, transitory or non-transitory computer-readable medium according to any one or more of the preceding clauses comprising:
at least one I/O device(s) associated with and communicatively connected to a terminal, arranged to select one or more file objects displayed on at least one associated graphical user interface(s) associated with the terminal;
a database stored on a computer-readable medium, containing parameters associated with one or more criteria for performing a sequence of one or more commands;
at least one processor arranged to:
access properties of file(s) associated with the one or more file objects;
compare the properties of the file(s) with the parameters associated with one or more criteria to determine which criteria are met;
retrieve, from the database stored on a computer-readable medium, parameters associated with sequences of one or more commands to be performed under specified conditions;
compare the met criteria to the specified conditions triggering sequences of one or more commands;
determine the appropriate sequence of one or more commands by matching the met criteria to the specified conditions; and
initiate the appropriate sequence of one or more commands to be performed on the file(s) represented by the displayed one or more file objects.

26. A method, terminal, system, signal or, transitory or non-transitory computer-readable medium according to any one or more of the preceding clauses comprising:
a computer storage apparatus encoded with a computer program, the program comprising instructions that when executed by data processing apparatus cause the data processing apparatus to perform operations, comprising:
receiving input data, at the at least one I/O device(s) associated with and communicatively connected to the terminal, selecting one or more file objects displayed on the at least one associated graphical user interface(s);
retrieving, from a database stored on a computer-readable medium, parameters associated with one or more criteria for performing a sequence of one or more commands;
accessing properties of file(s) associated with the one or more file objects;
comparing the properties of the file(s) with the parameters associated with one or more criteria to determine which criteria are met;
retrieving, from a database stored on a computer-readable medium, parameters associated with sequences of one or more commands to be performed under specified conditions;

comparing the met criteria to the specified conditions triggering sequences of one or more commands;

determining the appropriate sequence of one or more commands by matching the met criteria to the specified conditions; and initiating the appropriate sequence of one or more commands to be performed on the file(s) represented by the displayed one or more file objects.

Embodiments can work with software, hardware, and/or operating system implementations other than those described herein. Any software, hardware, and operating system implementations suitable for performing the functions described herein can be used. Embodiments are applicable to both a client and to a server or a combination of both.

While it is apparent that the illustrative embodiments of the disclosure herein fulfill one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one or one set of embodiments may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method, at a terminal having at least one associated graphical user interface(s)(GUI)(s) and one or more associated input/output (I/O) device(s), comprising:

receiving input data, at the one or more I/O device(s) associated with and communicatively connected to the terminal, selecting one or more file objects displayed on the at least one associated graphical user interface(s);

retrieving, from a database stored on a computer-readable medium, parameters associated with one or more criteria for performing a sequence of one or more commands;

accessing properties of file(s) associated with the one or more file objects;

comparing the accessed properties of the file(s) with the retrieved parameters associated with one or more criteria to determine which criteria are met;

retrieving, from a database stored on a computer-readable medium, sequences of one or more commands to be performed under specified conditions;

calculating an appropriate sequence of one or more commands by matching the met criteria to the specified conditions; and initiating the calculated sequence of one or more commands to be performed on the file(s) represented by the displayed one or more file objects.

2. The method according to claim 1, further comprising:

broadcasting indicia associated with one or more criteria on the at least one associated graphical user interface(s);

receiving input data at the at least one I/O device(s) designating one or more criteria associated with specified conditions for performing a sequence of one or more commands;

storing, in a database stored on a computer-readable medium, parameters associated with one or more criteria associated with specified conditions for performing a sequence of one or more commands.

3. The method according to claim 1, further comprising:

broadcasting indicia associated with one or more commands on the at least one associated graphical user interface(s);

receiving input data at the at least one I/O device(s) designating sequences of one or more commands to be performed under specified conditions;

storing, in a database stored on a computer-readable medium, sequences of one or more commands to be performed under specified conditions.

4. The method according to claim 1, further comprising:

receiving, at an application programming interface, data containing parameters designating one or more criteria;

storing, in a database stored on a computer-readable medium, the parameters associated with one or more criteria for performing a sequence of one or more commands.

5. The method according to claim 1, further comprising:

receiving, at an application programming interface, data containing parameters designating sequences of one or more commands;

storing, in a database stored on a computer-readable medium, the parameters associated with sequences of one or more commands to be performed under specified conditions.

6. The method according to claim 1, wherein specified conditions calling for a sequence of commands include previously executed commands in addition to criteria associated with file properties.

7. The method according to claim 1, further comprising providing a graphical user interface wherein the orders of the sequence of commands are moveable based on one or more motion(s) received at the I/O device.

8. The method according to claim 1, further comprising displaying an overlay onto the graphical user interface with text describing the sequence of commands that are predicted based on file properties to be taken when the file objects are selected.

9. The method according to claim 1, further comprising presenting spatial regions within an overlay in the graphical user interface where each region represents an alternative action list to perform.

10. The method according to claim 1, further comprising presenting images or text describing the status of the appropriate sequence of one or more commands to be performed on the file(s) represented by the displayed one or more file objects.

11. The method according to claim 1, wherein the criteria comprise one or more of:

file format(s) of the file(s);

size of the file(s);

conventions related to the name of the file(s);

an external context such as time of day, day of week, or geolocation;

a status of a window or application;
number of file(s):
storage location of the file(s):
size of image(s) in the file(s);
number of page(s) in the file(s);
metadata tags in the files such as modification times or authors,
fonts in the files;
text languages in the files;
presence or absence of specific colors or color spaces in the files; and
presence or absence of certain vector shape(s) in the files.

12. The method according to claim 1, further comprising outputting image data that is used to print on a substrate.

13. The method according to claim 1, wherein the appropriate sequence of one or more commands generates output data that is used to drive machines that perform printing, cutting, foiling, embossing, varnishing, and other related actions to produce items such as folding cartons, labels, signs, and books.

14. The method according to claim 1, wherein the appropriate sequence of one or more commands causes one or more machine(s) to export a CAD, PDF, or vendor-specific file that gets saved into a hot folder in a system that drives a cutting device.

15. The method according to claim 1, wherein the appropriate sequence of one or more commands snaps artwork into the matching die positions of the CAD layout on a sheet.

16. The method according to claim 1, wherein:
the selected one or more file objects are a CAD file or other layout template and one or more artwork file(s); and
the appropriate sequence of one or more commands to be performed on the files comprises:
importing a CAD file defining a layout template into the current project;
placing the imported layout template into a layout in the project;
importing artwork files into the current project; and
assigning each artwork file or artwork page to a position in the placed layout template.

17. The method according to claim 1, wherein:
the selected one or more file objects import job order information defined in a spreadsheet (e.g. CSV, Excel), XML data, or other text-based format into the current project; and
the appropriate sequence of one or more commands to be performed on the files comprises a subroutine matching artwork files to job orders by file name match.

18. The method according to claim 1, wherein:
the selected one or more file objects are an existing project file with a pre-defined layout that may contain the layout dimensions, printing marks, and other information about the project and a CAD file defining a layout template; and
the appropriate sequence of one or more commands to be performed on the files comprises:
opening the existing project file containing job orders or layouts; 30
importing a CAD file into the current project defining a layout template;
placing the imported layout template into a layout in the project;
importing artwork files into the current project; and
assigning each artwork file or artwork page to a position in the placed layout template.

19. A system comprising:
at least one 1/0 device(s) associated with and communicatively connected to a terminal, arranged to select one or more file objects displayed on at least one associated graphical user interface(s) associated with the terminal;
a database stored on a computer-readable medium, containing parameters associated with one or more criteria for performing a sequence of one or more commands;
at least one processor arranged to:
access properties of file(s) associated with the one or more file objects;
compare the accessed properties of the file(s) with the retrieved parameters associated with one or more criteria to determine which criteria are met;
retrieve, from the database stored on a computer-readable medium, parameters associated with sequences of one or more commands to be performed under specified conditions;
compare the met criteria to the specified conditions triggering sequences of one or more commands;
determine an appropriate sequence of one or more commands by matching the met criteria to the specified conditions; and
initiate the determined sequence of one or more commands to be performed on the file(s) represented by the displayed one or more file objects.

20. A computer storage apparatus encoded with a computer program, the program comprising instructions that when executed by data processing apparatus cause the data processing apparatus to perform operations, comprising:
receiving input data, at the at least one 1/0 device(s) associated with and communicatively connected to the terminal, selecting one or more file objects displayed on the at least one associated graphical user interface(s);
retrieving, from a database stored on a computer-readable medium, parameters associated with one or more criteria for performing a sequence of one or more commands;
accessing properties of file(s) associated with the one or more file objects;
comparing the accessed properties of the file(s) with the retrieved parameters associated with one or more criteria to determine which criteria are met;
retrieving, from a database stored on a computer-readable medium, parameters associated with sequences of one or more commands to be performed under specified conditions;
comparing the met criteria to the specified conditions triggering sequences of one or more commands;
determining an appropriate sequence of one or more commands by matching the met criteria to the specified conditions; and
initiating the determined sequence of one or more commands to be performed on the file(s) represented by the displayed one or more file objects.

* * * * *